United States Patent
Gloss et al.

(10) Patent No.: US 10,451,243 B2
(45) Date of Patent: Oct. 22, 2019

(54) LIGHT DEVICE, ESPECIALLY A SIGNAL LAMP FOR MOTOR VEHICLES

(71) Applicant: Varroc Lighting Systems, s.r.o., Senov u Noveho Jicina (CZ)

(72) Inventors: Tomas Gloss, Vitkov (CZ); Tomas Mateju, Bartosovice na Morave (CZ); Milan Stylarek, Mikulcice (CZ); Ludek Mazal, Tisek (CZ)

(73) Assignee: Varroc Lighting Systems, s.r.o., Senov u Noveho (CZ)

( * ) Notice: Subject to any disclaimer, the term of this patent is extended or adjusted under 35 U.S.C. 154(b) by 167 days.

(21) Appl. No.: 15/371,023

(22) Filed: Dec. 6, 2016

(65) Prior Publication Data

US 2017/0167688 A1    Jun. 15, 2017

(30) Foreign Application Priority Data

Dec. 11, 2015 (CZ) .................................. 2015-890

(51) Int. Cl.
*F21S 8/00* (2006.01)
*F21S 43/31* (2018.01)
(Continued)

(52) U.S. Cl.
CPC ............... *F21S 43/31* (2018.01); *F21S 43/13* (2018.01); *F21S 43/195* (2018.01);
(Continued)

(58) Field of Classification Search
CPC ........... F21S 41/16; F21S 41/285; F21S 41/24
See application file for complete search history.

(56) References Cited

U.S. PATENT DOCUMENTS 6,529,678 B2    3/2003  Shie et al.
8,465,193 B1    6/2013  Arik et al.
(Continued)

FOREIGN PATENT DOCUMENTS

EP    2821692 A1    1/2015
GB    2321300 A     7/1998
(Continued)

OTHER PUBLICATIONS

Machine Translation of WO 2015/140001.*
Search Report from Corresponding Application PV 2015-890 dated May 25, 2016 (3 pages).

*Primary Examiner* — Andrew J Coughlin
(74) *Attorney, Agent, or Firm* — Hovey Williams LLP

(57) ABSTRACT

A light device, especially a signal lamp for motor vehicles, includes a carrier housing (1) covered by a translucent cover (2) and an internal chamber (3) that houses an optical system comprising a light source (13) to generate coherent light (101) with a high luminous intensity. The optical system further comprises a lens (6) to direct the coherent light (101) generated by the light source (13) into a focused light beam (102), a divider (7) to divide the focused light beam (102) into separate light streams (103), and a diffusion means (9) to transform the light streams (103) entering the diffusion means (9) into homogenized light beams (104), the above mentioned parts of the optical system being arranged and configured for creating, in the front view, a spatial and/or designer light effect.

14 Claims, 9 Drawing Sheets

Figure 1:
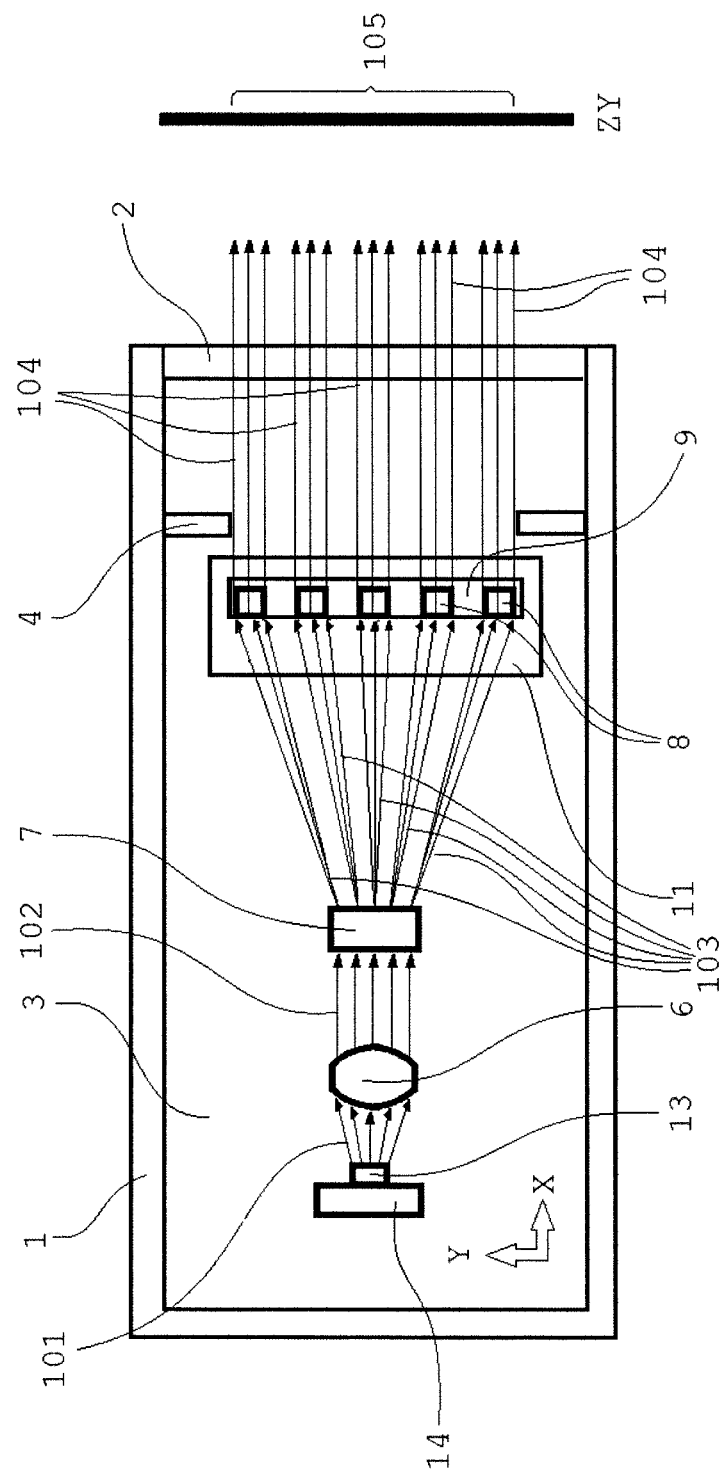

(51) Int. Cl.
  *G02B 27/10* (2006.01)
  *G02B 5/02* (2006.01)
  *F21S 43/13* (2018.01)
  *F21S 43/27* (2018.01)
  *F21S 43/235* (2018.01)
  *F21S 43/19* (2018.01)

(52) U.S. Cl.
  CPC .............. *F21S 43/235* (2018.01); *F21S 43/27* (2018.01); *G02B 5/0205* (2013.01); *G02B 5/0294* (2013.01); *G02B 27/1093* (2013.01)

(56) References Cited

U.S. PATENT DOCUMENTS

| | | |
|---|---|---|
| 8,502,695 B2 | 8/2013 | Kishimoto |
| 2011/0280032 A1 | 11/2011 | Kishimoto |
| 2013/0027962 A1* | 1/2013 | Takahashi ................. F21V 9/30 362/538 |
| 2013/0271947 A1 | 10/2013 | Finsterbusch et al. |
| 2014/0307457 A1 | 10/2014 | Chen |
| 2015/0043233 A1 | 2/2015 | Bauer et al. |
| 2015/0369437 A1 | 12/2015 | Reinprecht et al. |
| 2016/0265733 A1 | 9/2016 | Bauer et al. |

FOREIGN PATENT DOCUMENTS

| | | |
|---|---|---|
| WO | 2012/076296 A2 | 6/2012 |
| WO | 2014/072227 A1 | 5/2014 |
| WO | 2014/121315 A1 | 8/2014 |
| WO | 2015/049048 A1 | 4/2015 |
| WO | 2015/058227 A1 | 4/2015 |
| WO | 2015/140001 A1 | 9/2015 |
| WO | WO 2015140001 A1 * | 9/2015 .............. F21S 41/14 |

* cited by examiner

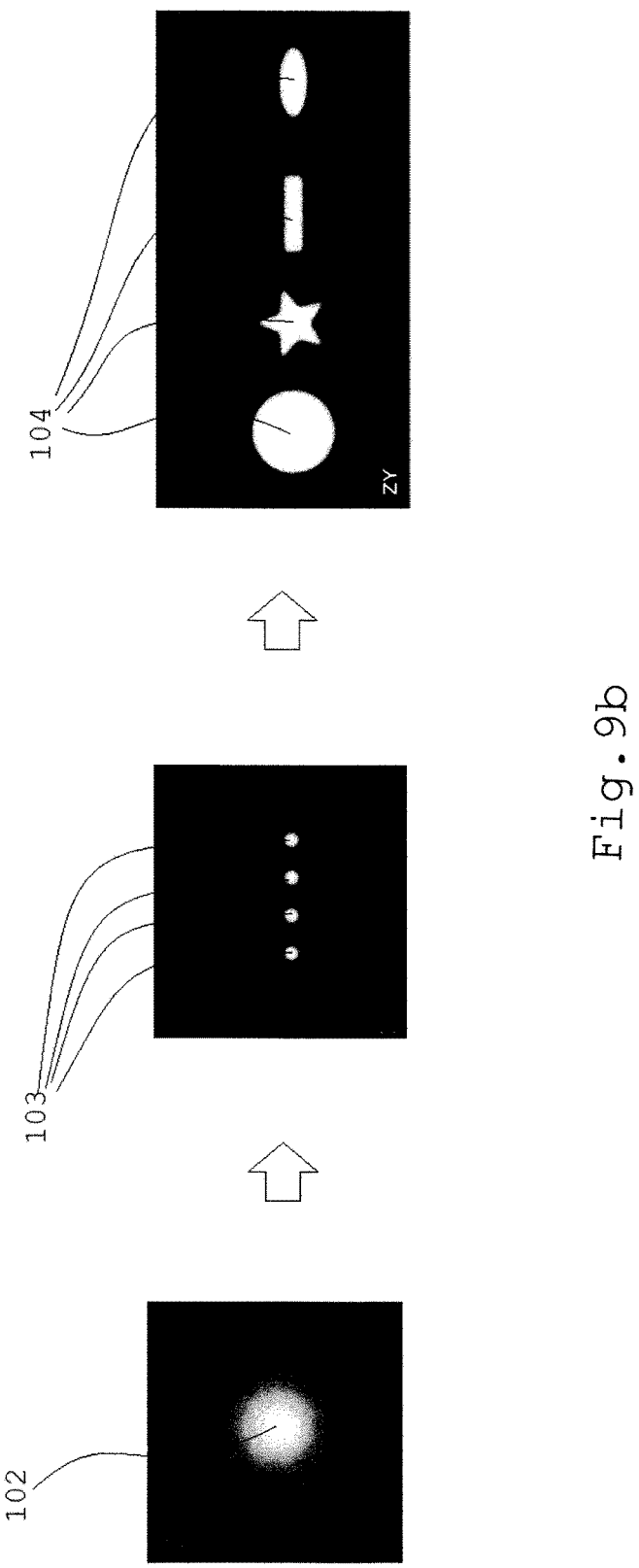

LIGHT DEVICE, ESPECIALLY A SIGNAL LAMP FOR MOTOR VEHICLES

FIELD OF THE INVENTION

The invention falls within the field of signal lamps, especially those of motor vehicles, and relates to a light device comprising a lighting unit equipped preferably with a laser diode, wherein at the boundary of an impure semiconductor electric energy is transformed into coherent light.

BACKGROUND INFORMATION

A signal lamp, especially for motor vehicles, contains multiple lighting units wherein each of these lighting units provides a different light function or contributes to ensuring the required emission characteristic of the light trace. Individual lighting units are generally mounted in a shaped carrying housing of the lamp, while each unit contains at least one light source and other optical elements. The light source emits light rays and the optical elements represent a system of refractive and reflective surfaces and interfaces of optical environments that influence the direction of light rays within the creation of the output light trace.

In modern headlights of motor vehicles, lighting units containing light sources in the form of semiconductor elements are frequently used. Advantages of LED light sources include durability, compact dimensions, low power consumption and higher designer variability of the optical concept. A disadvantage of optical concepts equipped with LED light sources is the fact that to provide the required output characteristics of the light trace and to create spatial light effects or other design elements, a higher number of LED's must be used.

A laser diode is known from the prior art, at the PN junction of which electric power is transformed to light. Unlike LED's, light corresponding with its characteristics to laser light is generated. The emitted light has a significantly narrower spectrum, it is strongly monochromatic and is coherent.

Thus, laser diodes may be used, unlike LED's, in applications where a sharply directional light beam is required. The documents US20110280032A1, WO2015140001A1, US20150043233A1, WO2014121315A1 have disclosed light devices where laser diodes make it possible to precisely focus light rays in a particular direction and also to hit a very distant point, which is used in the headlights of motor vehicles to ensure the high beam function wherein the light may be emitted up to the distance of 600 m in front of the vehicle because, thanks to the better targetability of the laser diode, the laser beam does not lose more than 20% of its light, while in the case of LED's up to 80% of light rays may be lost or scattered this way. Another advantage of laser diodes is the fact that optical concepts using laser diodes may be up to 1000 times more powerful than LED's, only consuming two thirds of energy compared to them. A disadvantage of laser as well as LED optical concepts is the fact that excessive light intensity may harm vision and the headlights of vehicles must be fitted with safety elements to avoid exceeding of safety limits, especially in case of damage of fluorescent phosphor substances or the entire laser diodes. Safety elements for laser beam emission are described e.g. in the documents WO2014072227A1, EP2821692A1, WO2015049048A1, WO2012076296A3, U.S. Pat. No. 8,502,695B2. A disadvantage of present optical concepts is the fact that the benefits of laser diodes are mainly used for the headlights of motor vehicles where a high-intensity light trace must be provided, while blue and white light may harm vision.

From the prior art, diffraction dividers of the laser beam are known that consist of a binary grating that is designed in such a way to divide coherent light emitted from the laser diode to a particular number of light streams. The surface microstructure of the binary grating acts as a photon router to direct photons to a pre-defined space, while the shape of the binary grating determines the shape and number of individual light streams and the shape and position of the output light patterns on the display surface. The topographical profile of the diffraction grating may have more surface levels that are made of etched silica glass and/or another glass type and/or polymeric material. A disadvantage of the prior art is the fact that optical systems comprising a laser beam diffraction divider are not adapted to create the required output characteristics for lighting devices intended for land road traffic.

The documents U.S. Pat. Nos. 6,529,678, 8,465,193, 6,529,678 disclose designs of optical means for propagation of light in such a way that at the output the light propagates at a certain defined space angle and with a defined intensity distribution. The document US20140307457 discloses a lamp equipped with a light source designed to emit a laser beam as well as with a light dividing element arranged in the emission direction of the light beam from the laser source to divide the laser beam into a higher number of partial beams. Elements for routing the partial beams to a plane parallel to the original laser beam are arranged in the direction of the partial beams, while the partial beams are bound to light diffusion elements in the form of lenses to achieve a homogeneous distribution of light. The diffused light is directed onto a screen fitted with a microstructural surface that contributes to homogeneous diffusion of light generated by the laser source, wherein a lit band or area is emitted onto the display surface to fulfil the daytime lighting function. A disadvantage of this design consists in limited designer possibilities because they do not make it possible to create a light trace of an irregular shape or to meet designer requirements for the output light beam when a spatial or design effect is required to be produced in the front view. The prior-art solution is not designed to provide more various lighting functions.

The goal of the invention is to design a light device, especially a signal lamp for motor vehicles that makes it possible to create spatial light effects or to meet other design requirements for the output light beam and at the same time is adapted to ensure several light functions of a lamp, while to provide the required output characteristics of the light trace and to create spatial light effects or other design elements a relatively small number of light sources, especially in the form of a laser diode, need to be used.

PRINCIPLE OF THE INVENTION

The above mentioned goals of the invention are achieved by a light device, especially a signal lamp for motor vehicles comprising a carrier housing covered by a translucent cover and an internal chamber that houses an optical system comprising a light source to generate coherent light with a high luminous intensity, wherein the optical system parts further include a lens to direct the coherent light generated by the light source into a focused light beam, a divider to divide the focused light beam into separate light streams, and a diffusion element to transform the light streams entering the diffusion element into homogenized light beams, wherein the above mentioned parts of the optical system being arranged and configured for creating, in the front view, a spatial and/or designer light effect.

In one of the embodiments, the light source comprises at least one laser diode.

In one of the embodiments, the diffusion element is arranged at the exit from the optical system for emission of homogenized light beams from the diffusion element in the direction that is approximately parallel to the longitudinal axis of the vehicle, and for creation of pre-defined light patterns from these light beams on a display surface situated outside the light device.

In one of the embodiments, the divider is adapted to bend light by diffraction.

In one of the embodiments, the diffusion element comprises a microstructure to further improve the homogenization.

In one of the embodiments, the diffusion element is adapted to change the colour spectrum of the light stream.

The optical system advantageously contains a reflector configured to direct homogenized light beams to a direction that is approximately parallel to the longitudinal axis of the vehicle.

The reflector is advantageously fitted with a diffusion segment to produce exact edges of individual light patterns on the display surface situated outside the light device, and to achieve a better boundary between the light patterns and unlit parts on this display surface.

In one of the preferred embodiments, the optical system comprises reflective surfaces located and designed to direct the light beams to the reflector and/or to the diffusion element.

In one of the embodiments, the optical system comprises a safety element positioned in such a way that the light stream falls onto it, the safety element being designed to switch off the light source if it detects characteristics of the light stream that are harmful to human health or otherwise unacceptable.

In one of the embodiments, the light source, lens and divider are installed in a light unit that further contains a holder or holders to fix the light source, lens and divider in the light unit.

At the exit side of the light streams from the divider a cap is preferably provided.

In one of the embodiments, the optical system comprises another optical element designed to improve the optical characteristics of the light stream. The optical element may be a light guide at the output of which the diffusion element is attached.

OVERVIEW OF FIGURES IN THE DRAWINGS

Figure 2:
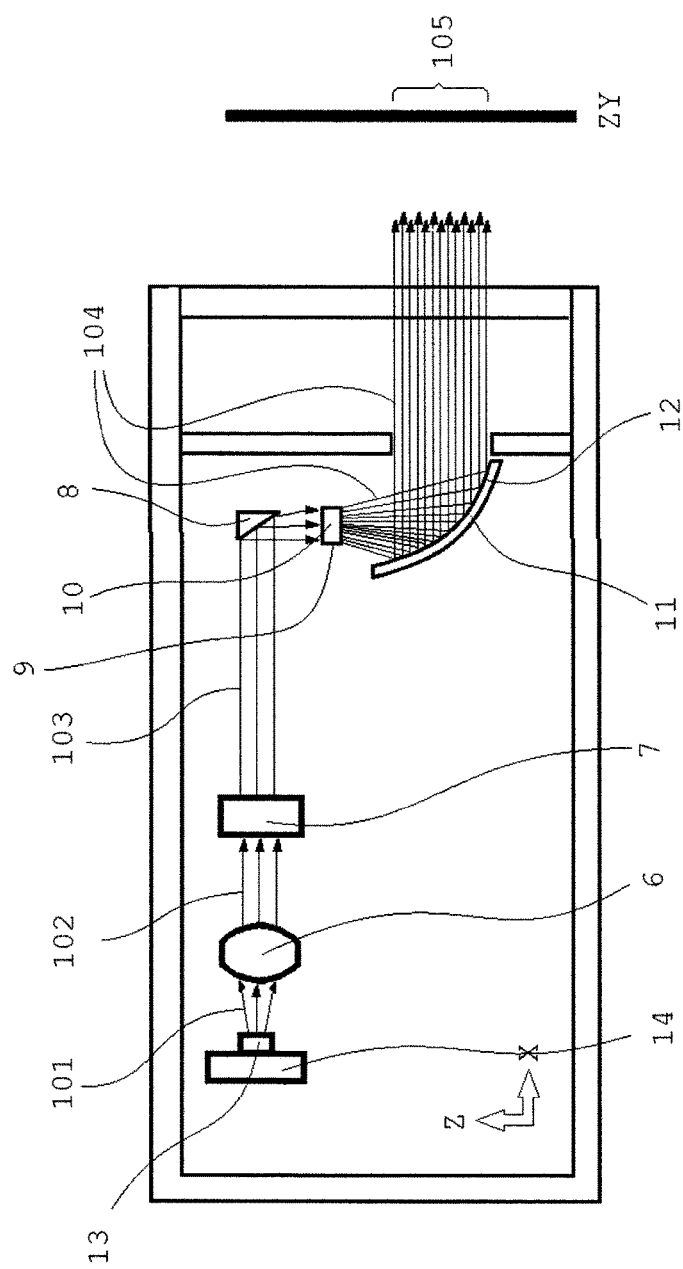
Figure 4:
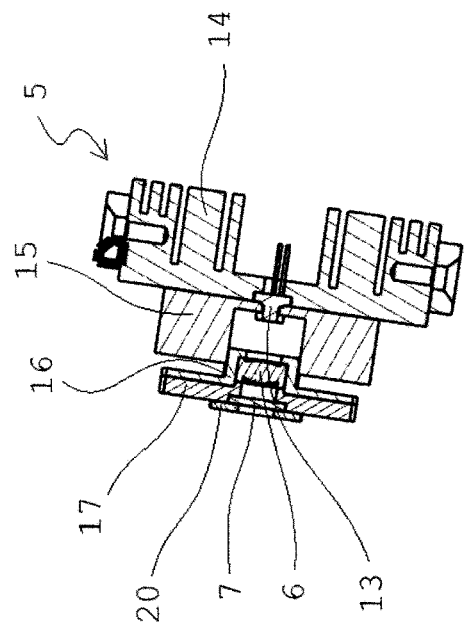
Figure 3:
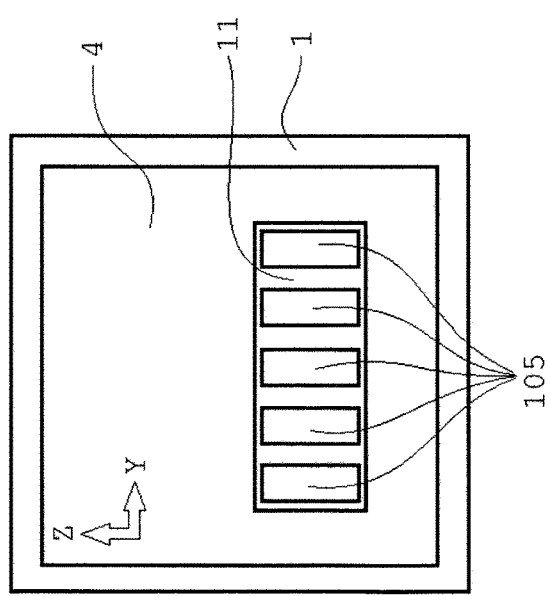
Figure 5:
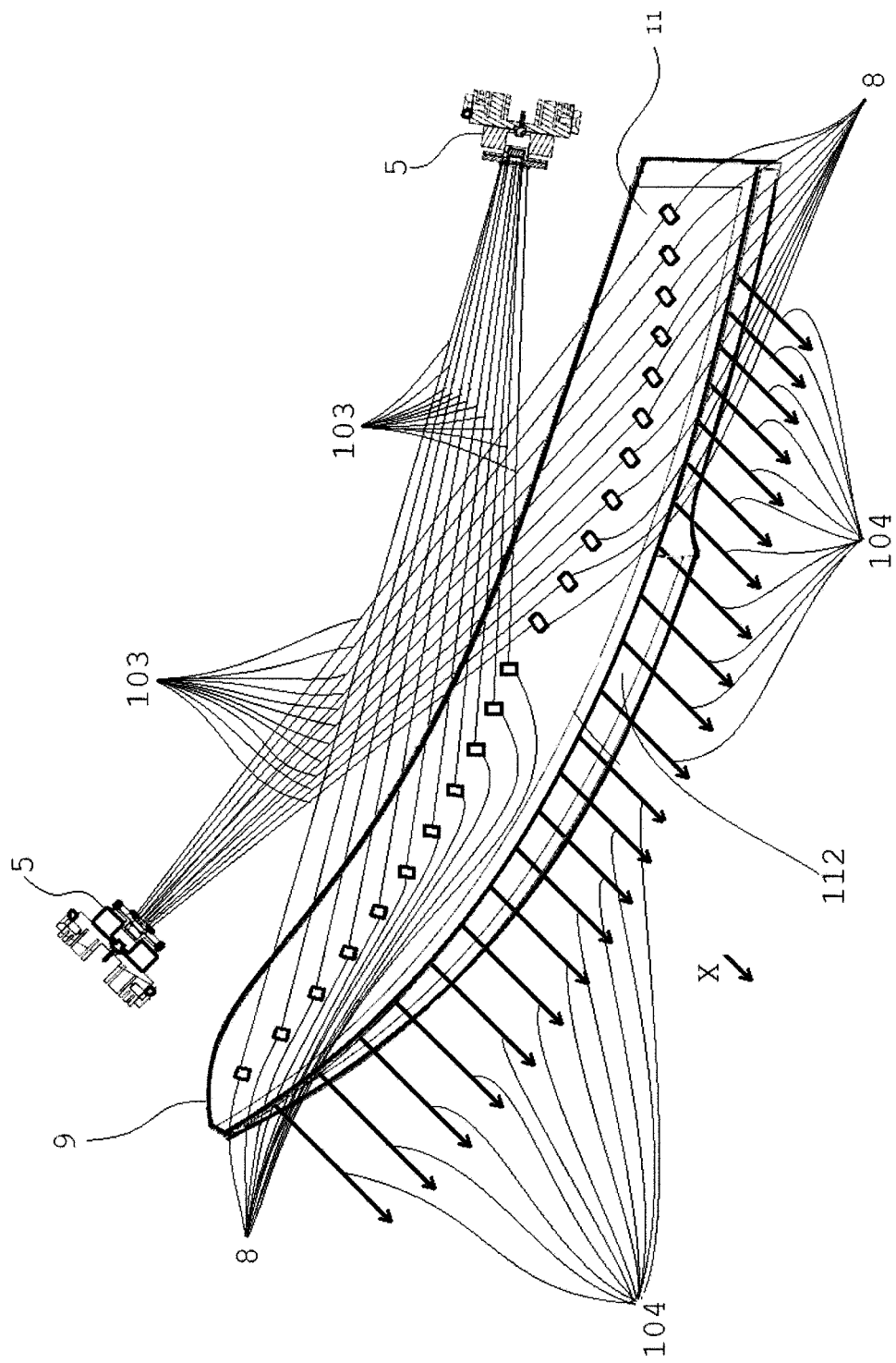
Figure 6:
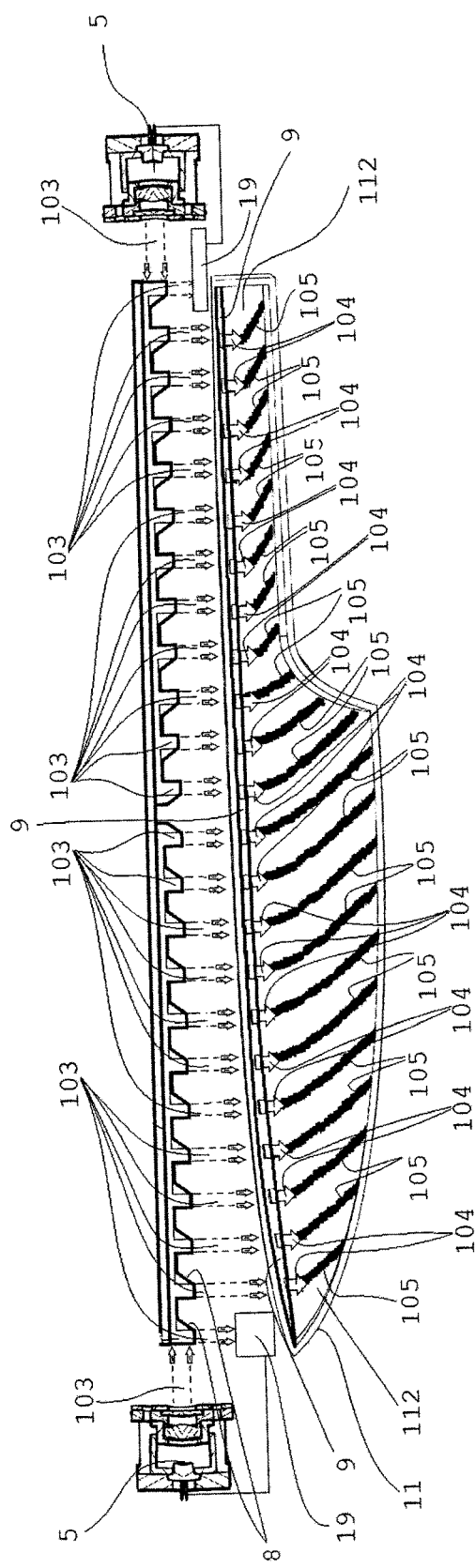
Figure 7:
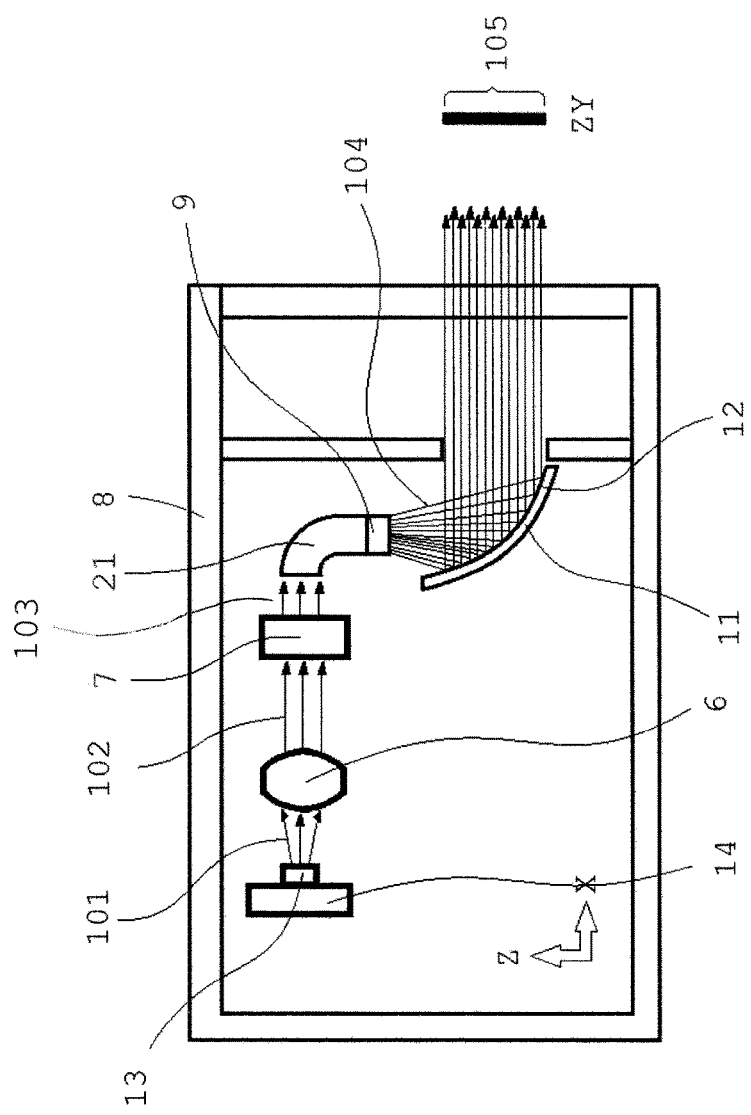
Figure 8:
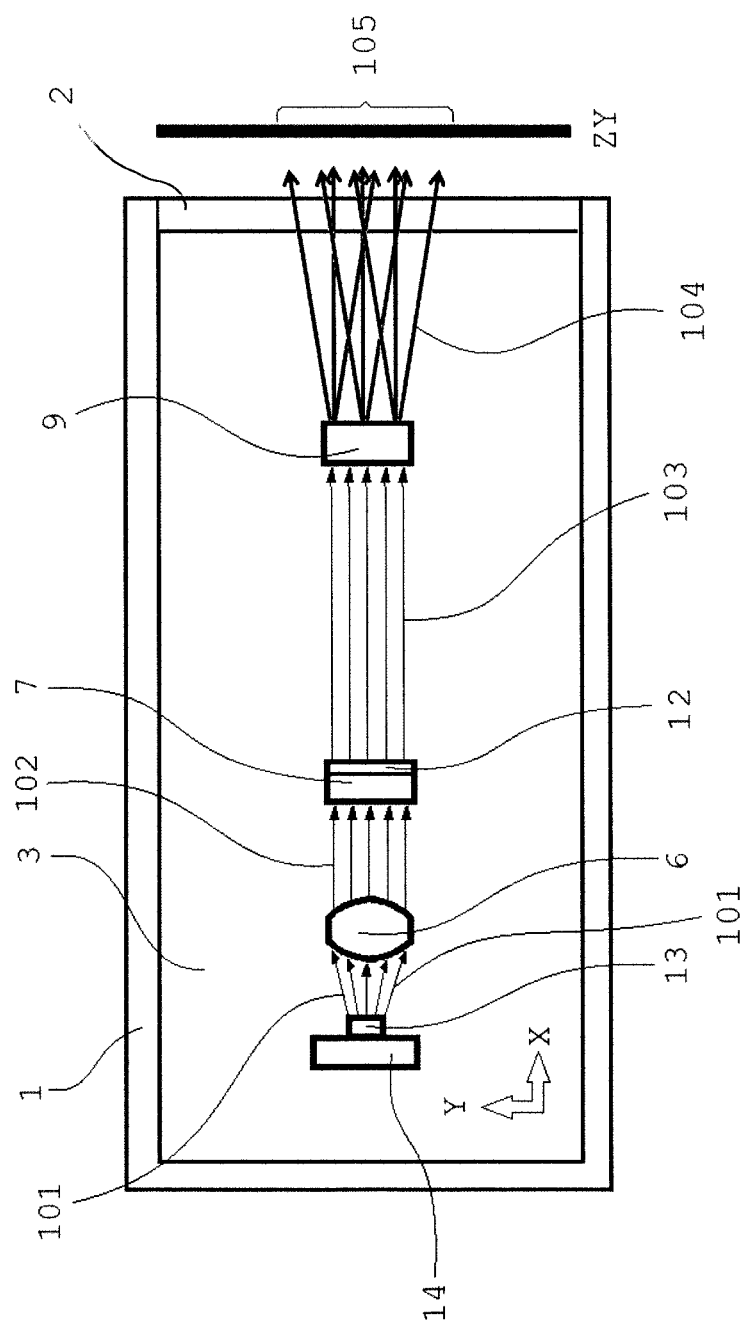
Figure 9A:
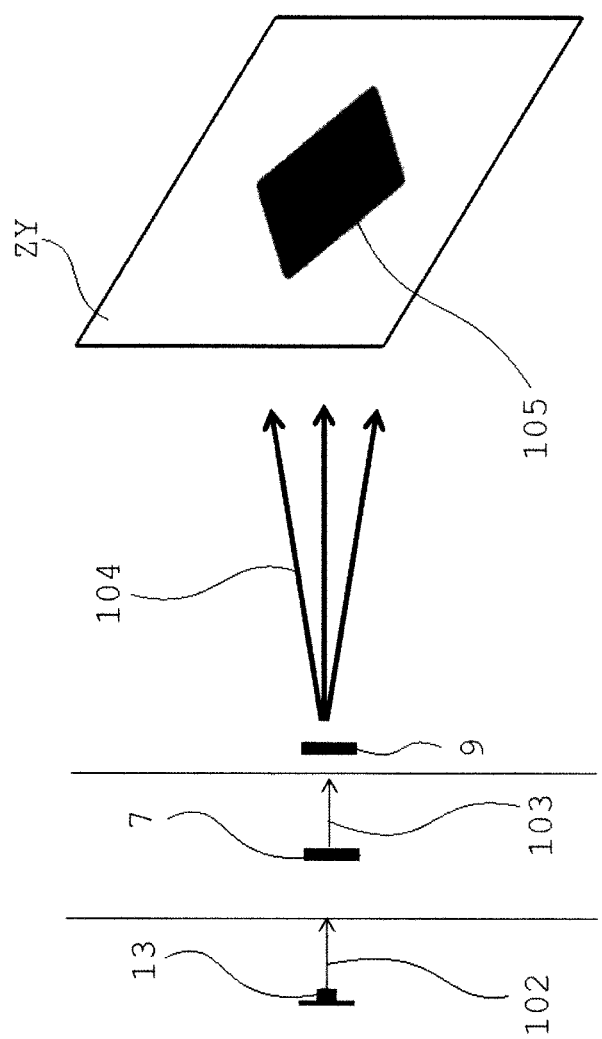

The invention will be clarified in a more detailed way with the use of its embodiment examples with references to attached drawings, where:

FIG. 1 shows a schematic representation of a top view of a first embodiment of the light device according to the invention, FIG. 2 shows a vertical cross-section through the light device from FIG. 1, FIG. 3 shows a front view of the light device from FIG. 1, FIG. 4 shows a cross-sectional view of a detail of the internal arrangement of the light unit, FIG. 5 shows a top axonometric view of another preferred embodiment of the light device according to the invention, FIG. 6 shows a front view of the light device from FIG. 5, FIG. 7 shows a vertical cross-section through another embodiment of the light device according to the invention, FIG. 8 shows a vertical cross-section through another embodiment of the light device according to the invention, FIG. 9a shows a schematic representation of the formation of the light trace, and FIG. 9b shows the shape of the light trace of the laser source, light unit and diffusion element.

EXAMPLES OF EMBODIMENTS

A light device according to the invention comprises a light source 13 of coherent light 101 having a very high luminous intensity that preferably comprises at least one laser diode.

According to FIG. 1, FIG. 2 and FIG. 3, the light device comprises a carrier housing 1 covered by a translucent cover 2, internal chamber 3 that houses a covering mask 4 and an optical system housed in the internal chamber 3 and comprising a light source 13, which is preferably a laser diode, a lens 6 and a divider 7 adapted to divide the light beam 102. The divider 7 is a diffraction divider and it is designed to produce more separate light streams 103 from one focused light beam 102. The internal chamber 3 further comprises a reflector 11 and separate reflective surfaces 8 for each light stream 103, and a diffusion element 9 for diffusion of light beams. In the embodiment example, the diffusion element 9 is fitted with a microstructure 10 to propagate light at a defined space angle only and with a defined intensity distribution through diffraction. The diffusion element 9 is, through the microstructure 10, adapted to emit the homogenized light beam 104 falling onto the reflector 11, which is preferably fitted with a diffusion segment 12 to produce a better boundary between the light patterns 105 and unlit parts on the display surface ZY. The light source 13 is preferably a laser diode that is connected to a cooler 14 for dissipation of heat generated by the light source.

FIG. 4 shows a light unit 5 designed to generate a focused light stream 103. The light unit 5 comprises a light source 13, preferably in the form of a laser diode, attached to a carrier 15, the light source 13 being connected to a cooler 14 for dissipation of generated heat. On the carrier or holder 15 a holder 16 of the lens 6 is attached, to which a holder 17 for housing a divider 7 is fixed, with an outwardly oriented cap 20 to produce a better light/darkness boundary being preferably fixed to it. The lens holder 16 and divider holder 17 may preferably form one compact part. The divider 7 is situated near the light source 13, the respective holders 15, 16, 17 being designed to efficiently guide/reflect the coherent light 101, which is not shown here, emitted from the light source 13.

FIG. 5 shows an optical system comprising two light units 5 arranged opposite each other, emitting in the horizontal direction twenty-two light streams 103 altogether, the streams being directed by the reflective surfaces 8 to the diffusion element 9. The homogenized light beam 104 is directed into a spatially shaped reflector 11 designed to route and/or shape the homogenized light beam 104 in the space. The reflector 11 emits twenty-two spatially shaped and homogenized output light beams 104 producing a light trace containing twenty-two separate light patterns 105, which are not shown here, on the display surface ZY.

FIG. 6 shows an alternative embodiment where the optical system comprises two light units 5 arranged opposite each other, emitting twenty-four light streams 103 altogether, focused in the horizontal direction. Twenty-four reflective surfaces 8 are situated in the direction of the optical streams to deflect the light streams 103 in the vertical direction to the diffusion element 9 and preferably to two safety elements 19 as well. The safety elements 19, e.g. transducers, detectors, or sensors are designed to switch off the light unit 5 if they detect unacceptable characteristics of the light stream 103, e.g. if they detect damage of the fluorescent phosphor substances or the entire laser diodes, or if the allowed light intensity is exceeded. The diffusion element 9 is fitted with an output microstructure, which is not referred to in the picture, to emit twenty-two homogenized light beams 104, which are mainly routed into the direction of the vehicle axis X, having fallen onto the spatially shaped, diffusion, reflective surface 112 of the reflector 11. The light trace emitted by the reflector 11 contains twenty-two separate light patterns 105.

FIG. 7 shows another alternative embodiment of the light device wherein the optical system comprises an optical element 21 to improve the optical characteristics of the light stream 103 as to homogeneity, intensity, light flux direction etc. In this case, the optical element 21 is designed as a light guide fitted with a diffusion element 9 at the light exit side.

FIG. 8 shows another alternative embodiment of the light device comprising a carrier housing 1 covered by a translucent cover 2 and having an internal chamber 3, housing the optical system comprising a light source 13, lens 6, divider 7 and diffusion element 9. The divider 7 is fitted with a diffusion segment 12 to produce a better boundary of the light patterns 105 and unlit parts on the display surface ZY.

FIGS. 9a and 9b show a light source 13 comprising a laser diode for generation of a single high-intensity focused light beam 102. The divider 7 produces four light streams 103 that are transformed through the diffusion element 9 in such a way that the exiting light in the form of homogenized light beams 104 only propagates at a defined space angle and with a defined intensity distribution, which produces light patterns 105 with a defined light distribution (shape, intensity, colour) on the display surface ZY.

The light source emits red, white, yellow, green or blue light, or coherent light 101 consisting of any combination of these colours, having a high luminous intensity, the light being emitted towards a lens 6 designed preferably as a collimating optical element, while the lens 6 produces a focused light beam 102. The focused light beam 102 is routed to a divider 7, preferably designed to bend light by means of diffraction. The divider 7 divides the light beam 102 into the required number of light streams 103. The light streams 103 are further directed to the diffusion element 9, which transforms the light streams 103 into homogenized light beams 104, preferably by means of diffraction and/or change of the colour spectrum through a wavelength change. The homogenized light beams 104 preferably pass through the diffusion segment 12, which produces at least one light pattern 105 on the display surface whose appearance has the required shape, intensity, homogeneity, and wavelength, there being no grid between the lit and unlit part that would be visible by the naked eye. The light streams 103 and/or the homogenized light beams 104 can be further routed and transformed by means of more optical elements 21, such as reflectors 11, light guides, collimators, or lenses, in such a way that the optical system can improve the optical characteristics and/or synergy with the mechanical, technological and design requirements of the light device can be achieved.

The described and shown embodiments do not represent the only possible design of the light device. The light source 13 may comprise fluorescent phosphor or other substances for transformation of the light beam generated by the laser diode. The light device may be adapted to produce a multicoloured light trace wherein the light source 13 emits light beams of different colours. This can be achieved, e.g., by the light source 13 containing more laser diodes that emit light of different colours.

LIST OF REFERENCE MARKS

1—carrier housing
2—translucent cover
3—internal chamber
4—covering mask
5—light unit
6—lens
7—divider
8—reflective surface
9—diffusion element
10—microstructure
11—reflector
12—diffusion segment
13—light source
14—cooler
15—carrier
16—lens holder
17—divider holder
19—safety element
20—cap
21—optical element
101—coherent light
102—focused light beam
103—light stream
104—homogenized light beam
105—light pattern
112—reflective surface
X, Y, Z—coordinate axes of the Cartesian coordinate system
ZY—display surface

The invention claimed is:

1. A light device, especially a signal lamp for motor vehicles, comprising a carrier housing (1) covered by a translucent cover (2) and having an internal chamber (3) that houses an optical system comprising:
   (a) a light source (13) to generate coherent light (101) with a high luminous intensity,
   (b) a lens (6) to direct the coherent light (101) generated by the light source (13) into a focused light beam (102),
   (c) a splitter (7) configured to split the focused light beam (102) into several separate light streams (103) of light rays, each of the separate light streams (103) having a propagation axis along which the separate light streams (103) exit the splitter (7) thereby providing a plurality of propagation axes exiting the splitter (7), wherein the propagation axes of the separate light streams (103) are mutually diverging and/or parallel, and
   (d) a diffusion element (9) configured to transform each of the separate light streams (103) of light rays entering the diffusion element (9) into separate homogenized light beams (104) of light rays,
   wherein the light device is configured to create predefined light macro patterns (105) on a display surface (ZY) situated outside a motor vehicle so that each light macro pattern (105) is created by one of the homogenized light beams.

2. The light device according to claim 1, wherein the light source (13) comprises at least one laser diode.

3. The light device according to claim 1, wherein the diffusion element (9) is arranged at the exit from the optical system for emission of the homogenized light beams (104) from the diffusion element (9) in a direction that is approximately parallel to a longitudinal axis (X) of the vehicle.

4. The light device according to claim 1, wherein the splitter (7) is configured to bend light through diffraction.

5. The light device according to claim 1, wherein the diffusion element (9) comprises a microstructure (10) for further improvement of the homogenization.

6. The light device according to claim 1, wherein the diffusion element (9) is designed to provide a change of the colour spectrum of the light streams (103).

7. The light device according to claim 1, wherein the optical system comprises a reflector (11) configured to route the homogenized light beams (104) to a direction that is approximately parallel to a longitudinal axis (X) of the vehicle.

8. The light device according to claim 7, wherein the reflector (11) is provided with a diffusion segment (12).

9. The light device according to claim 7, wherein the optical system comprises reflective surfaces (8) that are located and designed to route the light streams (103) to the reflector (11) and/or to the diffusion element (9).

10. The light device according to claim 1, wherein the optical system comprises a safety element (19) positioned in such a way that at least a portion of the light streams (103) fall onto it, the safety element (19) being configured to switch off the light source (13) if it detects characteristics of the light stream (103) that are harmful to human health or otherwise unacceptable.

11. The light device according to claim 1, wherein the light source (13), lens (6) and splitter (7) are installed in a light unit (5) that further comprises a holder or series of holders (15, 16, 17) to fix the light source (13), lens (6) and splitter (7) in the light unit (5).

12. The light device according to claim 11, wherein a cap (20) is located at the exit side of the light streams (103) from the splitter (7).

13. The light device according to claim 1, wherein the optical system further comprises an optical element (21) designed to increase the homogeneity, intensity, or to change the light flux direction.

14. The light device according to claim 13, wherein the optical element (21) is a light guide at the exit of which the diffusion element (9) is installed.

* * * * *